(12) United States Patent
Vanderspek

(10) Patent No.: US 9,766,866 B2
(45) Date of Patent: *Sep. 19, 2017

(54) TECHNIQUES FOR DETERMINING INSTRUCTION DEPENDENCIES

(71) Applicant: NVIDIA CORPORATION, Santa Clara, CA (US)

(72) Inventor: Julius Vanderspek, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 139 days.

This patent is subject to a terminal disclaimer.

(21) Appl. No.: 13/867,935

(22) Filed: Apr. 22, 2013

(65) Prior Publication Data

US 2014/0317385 A1   Oct. 23, 2014

(51) Int. Cl.
*G06F 9/44* (2006.01)
*G06F 9/45* (2006.01)
*G06F 15/00* (2006.01)

(52) U.S. Cl.
CPC ............ G06F 8/433 (2013.01); G06F 8/4441 (2013.01)

(58) Field of Classification Search
CPC ....... G06F 11/3624; G06F 8/443; G06F 8/433
See application file for complete search history.

(56) References Cited

U.S. PATENT DOCUMENTS

| 5,179,702 A * | 1/1993 | Spix et al. | 718/102 |
| 6,085,035 A * | 7/2000 | Ungar | 717/116 |
| 6,292,938 B1 * | 9/2001 | Sarkar et al. | 717/138 |
| 6,308,320 B1 * | 10/2001 | Burch | 717/154 |
| 8,141,068 B1 * | 3/2012 | Thompson | G06F 8/433 717/151 |
| 2003/0005260 A1 * | 1/2003 | Garg | G06F 9/3013 712/23 |
| 2007/0143741 A1 | 6/2007 | Harris | |

(Continued)

OTHER PUBLICATIONS

Non-Final Office Action for U.S. Appl. No. 13/867,939, dated Dec. 21, 2016.

*Primary Examiner* — Li B Zhen
*Assistant Examiner* — Mohammad Kabir
(74) *Attorney, Agent, or Firm* — Artegis Law Group, LLP

(57) ABSTRACT

One embodiment sets forth a method for efficiently determining memory resource dependencies between instructions included in a software application. For each instruction, a dependency analyzer uses overlapping search techniques to identify one or more overlaps between the memory elements included in the current instruction and the memory elements included in previous instructions. The dependency analyzer then maps objects included in the instructions to a set of partition elements wherein each partition element represents a set of memory elements that are functionally equivalent for dependency analysis. Subsequently, the dependency analyzer uses the set of partition elements to determine memory dependencies between the instructions at the memory element level. Advantageously, the disclosed techniques enable the compiler to retain an acceptable compilation speed while tuning the instruction ordering at a fine-grained memory element level, thereby increasing the speed at which the processor may execute the software application.

20 Claims, 10 Drawing Sheets

(56) References Cited

U.S. PATENT DOCUMENTS

| | | | |
|---|---|---|---|
| 2008/0244533 A1* | 10/2008 | Berg | G06F 11/3447 717/128 |
| 2009/0064095 A1* | 3/2009 | Wallach et al. | 717/106 |
| 2009/0199169 A1 | 8/2009 | Lin | |
| 2009/0271775 A1* | 10/2009 | Barsness et al. | 717/151 |
| 2010/0306508 A1* | 12/2010 | Day | G06F 9/30174 712/216 |
| 2012/0297373 A1* | 11/2012 | Gschwind | G06F 8/447 717/151 |

\* cited by examiner

TECHNIQUES FOR DETERMINING INSTRUCTION DEPENDENCIES

BACKGROUND OF THE INVENTION

Field of the Invention

The present invention generally relates to computer processing and, more specifically, to techniques for determining instruction dependencies.

Description of the Related Art

In conventional computer processing systems, to execute a software application within a particular processing device, such as a central processing unit (CPU) or a graphics processing unit (GPU), a compiler first translates an associated software application text file into an optimized sequence of machine instructions. Typically, the software application text file is written in a general purpose programming language (e.g., C++). And the machine instructions are targeted to a specific process architecture associated with the selected processing device.

As part of the process of optimizing instructions, the compiler conducts instruction scheduling. The purpose of instruction scheduling is to schedule the instructions in a more efficient order while preserving the semantics of the software application. In instruction scheduling, the compiler first determines how the instructions interact in the initial ordering. In particular, the compiler evaluates how the instructions access various memory resources (i.e., any element that holds state that an instruction may read or write). For example, consider the following initial sequence of instructions (where a, b, c, d, e, f, and g correspond to different memory resources):

a=b+c; //instruction 1
d=b+e; //instruction 2
f=a+g; //instruction 3

To optimize the ordering of these three instructions, a typical compiler would first construct a dependency graph in which instructions that could access a common memory resource were linked. For the example shown, such a dependency graph would capture that instruction 1 and instruction 2 would both read but would not write the same memory resource (i.e., "b"); instruction 1 would write the same memory resource (i.e., "a") that instruction 3 would, subsequently, read; and instruction 2 and instruction 3 would neither read nor write the same memory resources. Using this dependency graph, the compiler would evaluate various sequences of the three instructions to determine which sequence best optimized the overall execution efficiency of the software application, while preserving the results that would be obtained the instructions been executed in the original order (i.e., a "valid" reordering). Referring again to the above example, the compiler would not have the freedom to reorder the instructions such that instruction 3 occurred before instruction 1, because that reordering could change the results. By contrast, the compiler would have the freedom to reorder the instructions such that instruction 2 preceded instructions 1 since that reordering would not change the results.

Compilers typically treat a memory resource as a single entity. This representation is usually adequate for explicit hardware such as a single register. However, as the complexity and specialization of hardware architectures have increased, the concept of a memory resource has evolved. Increasingly, a memory resource may be artificial, used for convenient modeling of the architecture specific parts of the compiler. For example, the architecture may define register sets as memory resources. Each register set may include any number of different, mostly implicit, register banks, where each register bank may include any number of registers, and each register may include any number of bits.

Further, instructions in such architectures may access only one or more scattered subsets within a defined memory resource. For example, referring back to the above example, if memory resource "a" represents a register that includes 256 bits, RA[0:255], then instruction 1 may actually access only four scattered bits within RA: {RA[5], RA[56], RA[121], RA[255] }. Further, instruction 3 may actually access only two scattered bits within RA: {RA[50], RA[97] }.

Compilers may be configured to perform a dependency analysis in different ways. In one approach, the compiler conducts the dependency analysis of instructions conservatively. More specifically, the compiler considers each instruction to affect the entirety of each memory resource associated with the instruction. Referring back again to the above example, the compiler would consider instruction 1 to potentially write all 256 bits included in RA and instruction 3 to potentially read all 256 bits included in RA. Therefore, the compiler would not have the freedom to reschedule instruction 3 to precede instruction 1, even though such a reordering would not change the results (i.e., such a reordering would be valid). Thus, one drawback to this approach is that the compiler is unable to consider all valid reorderings and, therefore, may not be able to determine the optimal reordering. Consequently, the speed at which the processor executes the software application may not be fully optimized.

In an alternate approach, the compiler splits each memory resource into separate memory resources, each of which represents a single element (e.g., bit, register, etc.) included in the initial memory resource. Referring back again to the above example, the compiler would split RA into 256 separate bits before constructing the dependency graph. Unfortunately, constructing a dependency graph involves comparing each instruction with each of the other instructions to determine access to common memory resources. This evaluation is typically implemented using an N-square algorithm. And, as persons skilled in the art will understand, as the problem size increases (e.g., the number of objects increases or the number memory resources increases), the performance of N-square algorithms quickly degrades. Thus, although this second approach may reduce the conservatism of the first approach, the subsequent dependency analysis may result in an unacceptable increase in the time required to compile the code.

As the foregoing illustrates, what is needed in the art is a more effective approach for determining memory resource dependencies between instructions when compiling software applications.

SUMMARY OF THE INVENTION

One embodiment of the present invention sets forth a method for determining instruction dependencies in a software application. The method includes receiving a first instruction and a second instruction included in the software application; identifying a first object that is included in the first instruction and is associated with a first set of memory elements; identifying a second object that is included in the second instruction and is associated with a second set of memory elements; mapping the first object, the first set of memory elements, the second object, and the second set of memory elements to a partition structure that includes a set of disjunct partition elements representing memory element overlaps between objects; identifying a matching partition element associated with the first object; performing a lookup operation on the matching partition element to determine an object dependency between the first object and the second object; and determining an instruction dependency between the first instruction and the second instruction based on the object dependency.

Other embodiments of the present invention include, without limitation, a computer-readable storage medium including instructions that, when executed by a processing unit, cause the processing unit to implement aspects of the techniques described herein as well as a system that includes different elements configured to implement aspects of the techniques described herein.

By implementing the disclosed techniques, the compiler may reduce the problem size by identifying sets of memory elements that appear to be functionally equivalent (by the instructions observed) for dependency analysis. Consequently, the compiler may retain an acceptable compilation speed while tuning the instruction ordering at a fine-grained memory element level, thereby enabling the targeted processor to execute the software application at speeds exceeding those achieved using prior-art techniques.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

Figure 1:
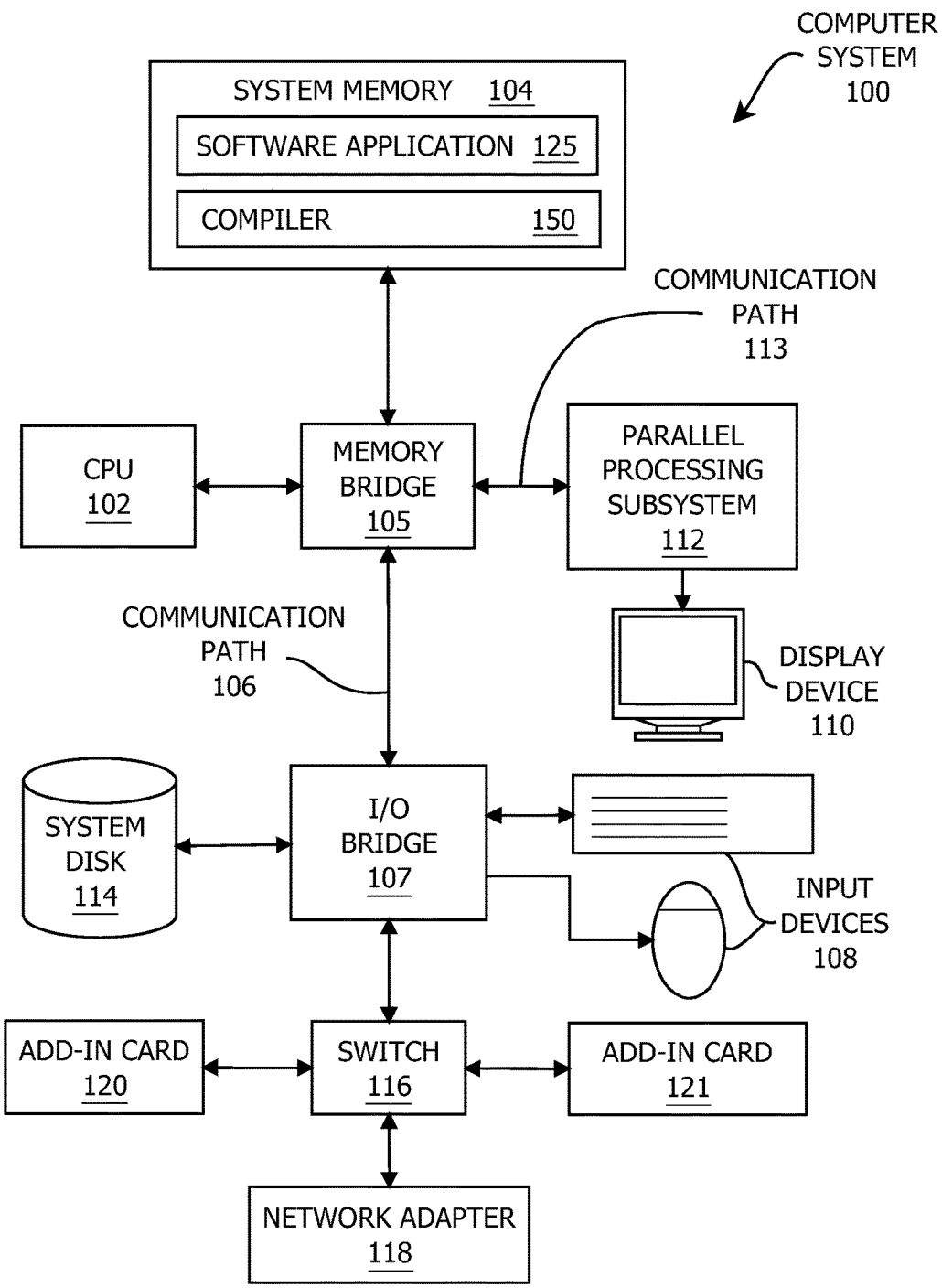
FIG. 1 is a block diagram illustrating a computer system configured to implement one or more aspects of the present invention.

FIG. 1 is a block diagram illustrating a computer system 100 configured to implement one or more aspects of the present invention. As shown, the computer system 100 includes, without limitation, a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via communication path 106 and memory bridge 105. A parallel processing subsystem 112 is coupled to memory bridge 105 via a bus or second communication path 113 (e.g., a Peripheral Component Interconnect (PCI) Express, Accelerated Graphics Port, or HyperTransport link); in one embodiment parallel processing subsystem 112 is a graphics subsystem that delivers pixels to a display device 110 (e.g., a conventional cathode ray tube or liquid crystal display based monitor). A system disk 114 is also connected to I/O bridge 107. A switch 116 provides connections between I/O bridge 107 and other components such as a network adapter 118 and various add-in cards 120 and 121. Other components (not explicitly shown), including universal serial bus (USB) or other port connections, compact disc (CD) drives, digital video disc (DVD) drives, film recording devices, and the like, may also be connected to I/O bridge 107. The various communication paths shown in FIG. 1, including the specifically named communication paths 106 and 113, may be implemented using any suitable protocols, such as PCI Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements in a single subsystem, such as joining the memory bridge 105, CPU 102, and I/O bridge 107 to form a system on chip (SoC).

In operation, CPU 102 is the master processor of computer system 100, controlling and coordinating operations of other system components. In particular, CPU 102 issues commands that control the operation of the parallel processing subsystem 112. Advantageously, the parallel processing subsystem 112 may execute commands asynchronously relative to the operation of CPU 120. Those commands may originate within a software application 125 resident in system memory 104. To execute the software application 125 within a particular processing device, such as CPU 102 or parallel processing subsystem 112, a compiler 150 first translates an associated software application text file into an optimized sequence of machine instructions targeted to a specific process architecture associated with the particular processing device.

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip instead of existing as one or more discrete devices. Large embodiments may include two or more CPUs 102 and two or more parallel processing subsystems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
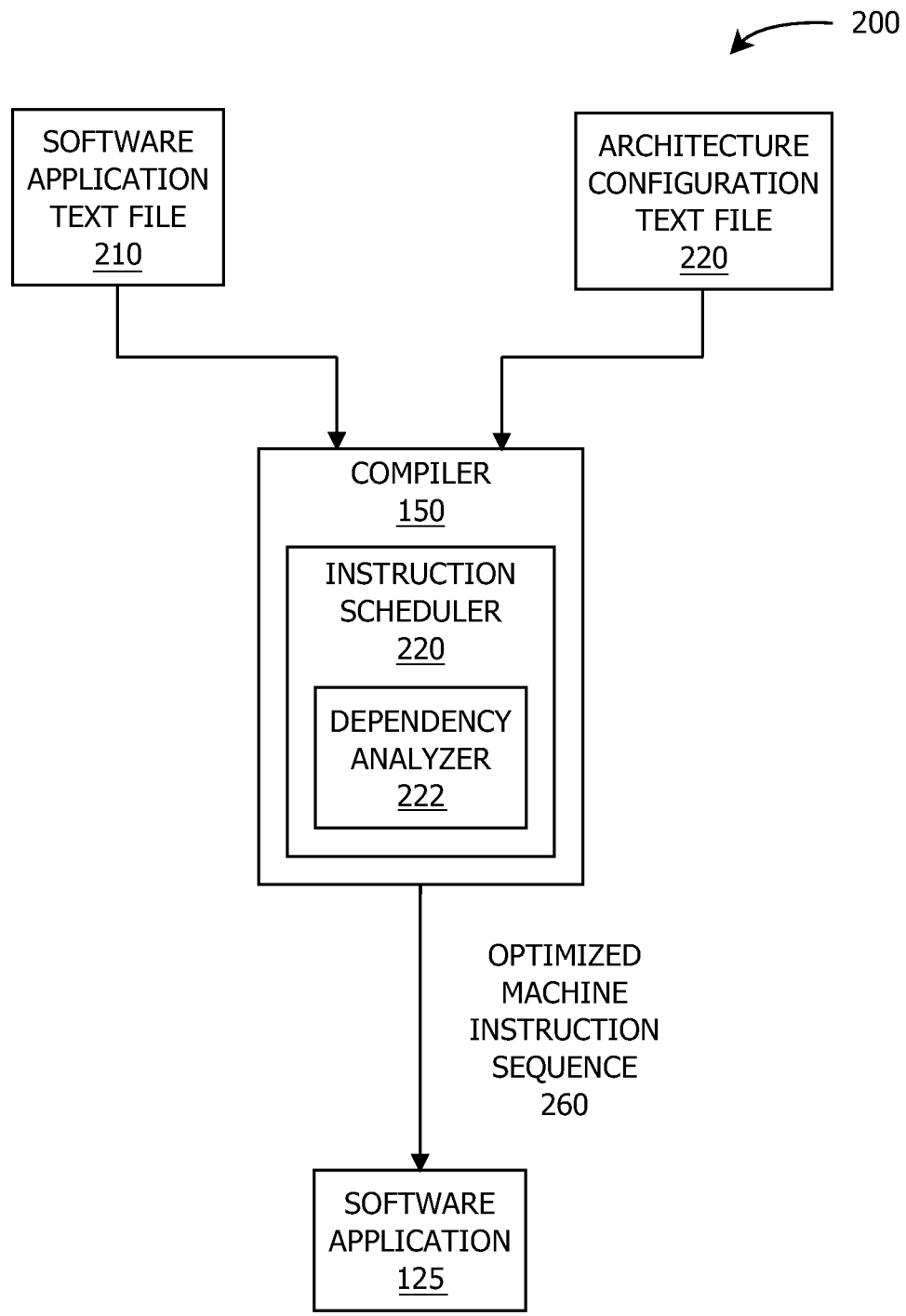
FIG. 2 is a conceptual diagram illustrating the generation of a software application of FIG. 1 by a compiler also of FIG. 1, according to one embodiment of the present invention.

FIG. 2 is a conceptual diagram illustrating the generation of the software application 125 of FIG. 1 by the compiler 150 also of FIG. 1, according to one embodiment of the present invention. As shown, the compiler 150 includes the instruction scheduler 220. Further, the instruction scheduler 220 includes the dependency analyzer 222. As also shown, the compiler 150 receives an architecture configuration text file 220 and a software application text file 210 as inputs and generates the software application 125. As part of the process of generating the software application 125, the compiler 150 generates an optimized machine instruction sequence 260.

Typically, the architecture configuration text file 220 describes a specific process architecture associated with a targeted processing device, such as the CPU 102 or the parallel processing subsystem 112, within which the compiled software application 125 is intended to execute. And the software application text file 210 describes, often in a general purpose programming language (e.g., C++), the intended functionality of the compiled software application 125 when executed within the targeted processing device.

To generate the software application 125, the compiler 150 first reads the architecture configuration text file 220 and the software application text file 210. The compiler 150 then translates the software application text file 210 into the optimized machine instruction sequence 260. As part of the process of generating the optimized machine instruction sequence 260, the instruction scheduler 220 conducts instruction scheduling. The purpose of instruction scheduling is to schedule the instructions in a more efficient order while preserving the intended functionality of the software application 125 when executed within the targeted processing device. In instruction scheduling, the instruction scheduler 220 first determines how the instructions interact in the initial ordering (i.e., as specified by the software application text file 210). In particular, the instruction scheduler 220 may use information specified by the architecture configuration text file 220 to evaluate how the instructions access various memory resources (i.e., any element that holds state that an instruction may read or write).

In one embodiment, to optimize the ordering of instructions, the dependency analyzer 222 (included in the instruction scheduler 220) constructs a dependency graph in which instructions that could access a common memory resource are linked. Using this dependency graph, the instruction scheduler 220 evaluates various sequences of instructions to determine the optimized machine instruction sequence 260. The optimized machine instruction sequence 260 represents the evaluated instruction reordering that best optimizes the overall execution efficiency of the software application 125, while replicating the results that would be obtained had the instructions been executed in the original order (i.e., a "valid" reordering).

Increasingly, the architecture configuration text file 220 may define instructions that may access only one or more scattered subsets of memory elements included in a defined memory resource. Further, the architecture may be defined at the granularity of the memory resource (e.g., register-level) while, in contrast, the memory accesses associated with an instruction may be defined at the granularity of the memory element (e.g., bit-level). As previously noted, many prior-art compilers handle a memory resource as a single entity. In other words, such prior-art compilers would construct the dependency graph conservatively—assuming that any instruction that accessed a particular memory resource could potentially access all memory elements included in the memory resource. In contrast, the instruction scheduler 220 and the included dependency analyzer 222 may be configured to treat memory resources at the more granular memory element level. In other words, the instruction scheduler 220 may be configured to treat accesses to the memory resources as accesses to only specific memory elements within the memory resources. Advantageously, during the construction of the optimized machine instruction sequence 260, such a configuration allows the instruction scheduler 220 to consider additional valid instructions reorderings that many prior-art approaches would erroneously consider invalid, thereby enabling the instruction scheduler 220 to more effectively optimize the original instruction sequence.

Figure 3:
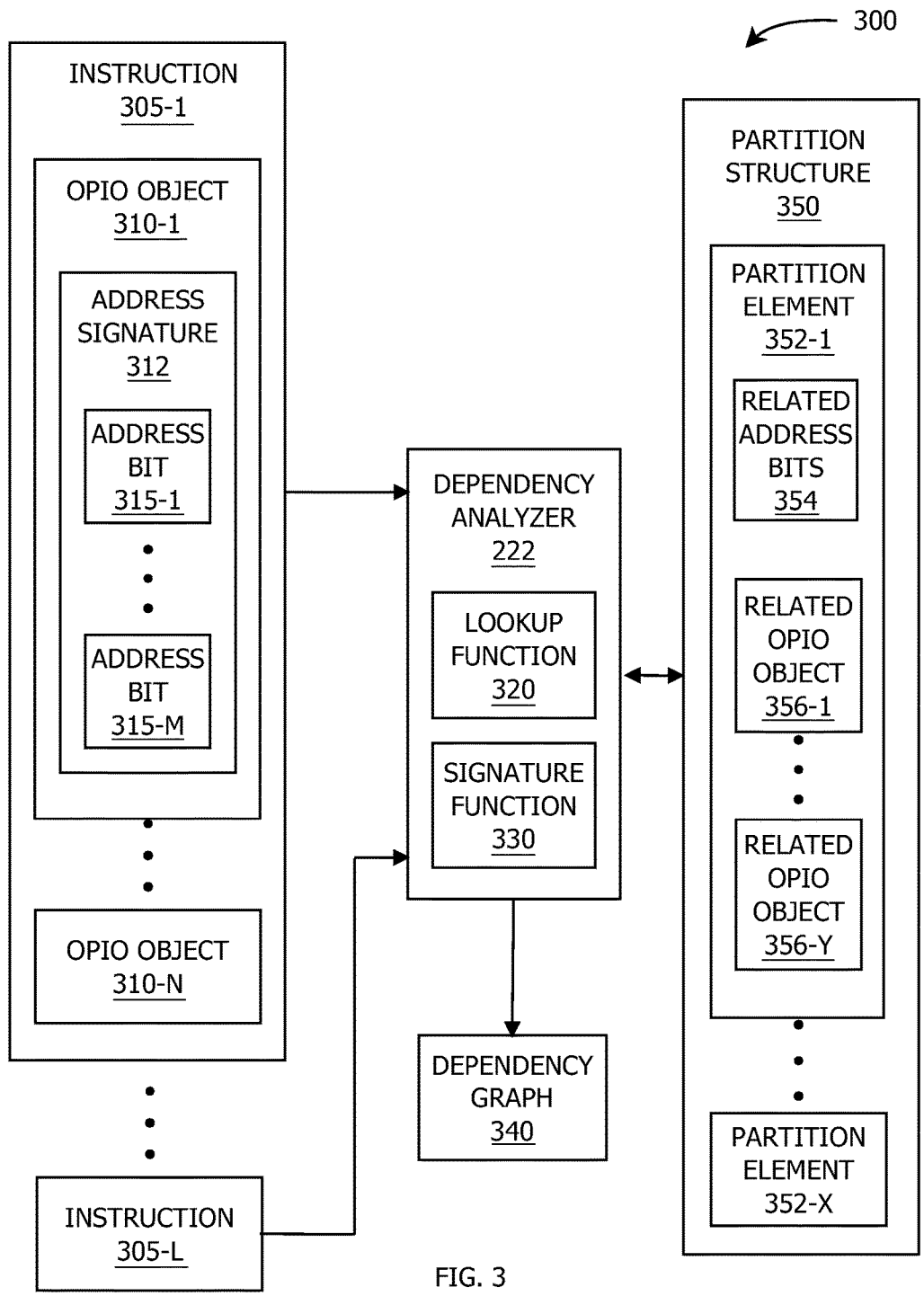
FIG. 3 is a conceptual diagram illustrating the generation of a dependency graph by the dependency analyzer of FIG. 2, according to one embodiment of the present invention.

FIG. 3 is a conceptual diagram illustrating the generation of a dependency graph 340 by the dependency analyzer 222 of FIG. 2, according to one embodiment of the present invention. As shown, the dependency analyzer 222 receives zero or more instructions 305. In general, the dependency analyzer 222 may receive a number L of instructions 305, where L≥0. (Herein, multiple instances of like objects are denoted with reference numbers identifying the object and hyphenated numbers identifying the instance where needed.) And, as part of determining the dependencies between the instructions 305, the dependency analyzer 222 creates and, subsequently, accesses a partition structure 350.

As shown, each instruction 305 includes one or more operation input-output (opio) objects 310. In operation, the instruction scheduler 220 of FIG. 2 considers a particular instruction 305 to access (i.e., read from, write to, or both read from and write to) each of opio objects 310 included in the particular instruction 305. For some steps included in the scheduling process, the instruction scheduler 220 treats each opio object 310 as representing a generalized description of an affected abstract memory area. Advantageously, by adopting this generalized view, the instruction scheduler 220 views memory accesses independently of the architecture-specific definition of memory resources and the included memory elements, thereby simplifying the compiler 150 code.

For other steps included in the scheduling process, the instruction scheduler 220 and the included dependency analyzer 222, consider each opio object 310 as representing architecture-specific memory elements. To enable this architecture-specific view, each opio object 310 includes an address signature 312 that defines the architecture-specific memory elements that may be accessed by the opio object 310. In general, address signatures 312 are an abstraction of different representations of resource descriptors (for different types of resources) internal to the compiler 150. Advantageously, address signatures 312 typically represent sets of numbers that are simple to manage by the dependency analyzer 222. Further, address signatures 312 provide a common representation that enables the dependency analyzer 222 to avoid including specialized components that perform functionally-equivalent work, but are tailored towards different resource description implementations.

More specifically, as shown, each address signature 312 includes one or more address bits 315. Consequently, for each opio object 310, the included address signature 312 defines the set of architecture-specific address bits 315 that may be accessed by the opio object 310. As previously noted, some instructions 305 may access one or more scattered subsets of memory elements within one or more defined memory resources. For example, if a memory resource "a" represented a 256-bit register RA[0:255] and a particular instruction 305 could only access the four scattered bits RA[5], RA[56], RA[121], and RA[255], then a particular opio object 310 included in the instruction 305 would include an address signature 312 that included only the four address bits 315 RA[5], RA[56], RA[121], and RA[255].

As the dependency analyzer 222 reads the instructions 305, the dependency analyzer 222 conducts the dependency analysis of the instructions 305. In many prior-art approaches, dependency analysis involves comparing each instruction 305 directly with each of the other instructions 305 to determine access to common memory resources (e.g., registers) using an N-square algorithm. However, since the performance of an N-square algorithm quickly degrades as the problem size increases, using an N-square algorithm directly in conjunction with the granular address bits 315 might result in an unacceptable increase in the time required to compile the code. Advantageously, as shown, the dependency analyzer 222 creates the partition structure 350 to reduce the size of the problem, consequently decreasing the likelihood of the time required to compile the code degrading to an unacceptable level. More specifically, the partition structure 350 includes one or more partition elements 352. And each partition element 352 includes one or more related address bits 354 that may be considered functionally identical for dependency analysis. Consequently, the dependency analyzer 222 may analyze memory access overlaps at the level of the partition elements 352, while obtaining the same quality of results that would be provided by a more time-consuming bit-level dependency analysis.

The partition elements 352 included in the partition structure 350 are mutually disjunct. In other words, a particular related address bit 354 (e.g., RA[5]) may be included in only one of the partition elements 352 included in the partition structure 350. And to ensure that the partition structure 350 completely and efficiently represents all of the instructions 305, the dependency analyzer 222 ensures that each of the address bits 315 included in the opio objects 310 included in the instructions 305 is also included as a corresponding related address bit 354 in exactly one of the partition elements 352. However, as persons skilled in the art will understand, since the address bits 315 included in the opio objects 310 may overlap (i.e., a particular address bit 315 may be included in more than one of the opio objects 310), each partition element 352 may include related address bits 354 corresponding to address bits 315 included in more than one opio objects 310. Accordingly, each partition element 350 also includes one or more related opio objects 356. Further, each of the related address bits 354 included in the partition element 352 corresponds to one of the address bits 315 included in each of the opio objects 310 corresponding to the related opio objects 356. For example, if a particular partition element 352 included two related address bits 354 RA[5] and RA[121], and the partition element 352 also included a related opio object 356, then the address signature 312 of the opio object 310 corresponding to the related opio object 356 would include the address bits 315 RA[5] and RA[121]. Further, the related opio object 356 could include additional address bits 315 that were not included in the partition element 352.

In alternate embodiments, each address bit 315 may be replaced by an abstract representation of any number of elements, such as address bits or a registers. Consequently, the partition elements 352 will be formed over the abstract representations instead of the address bits 315 and will include related abstract representations instead of related address bits 354. Advantageously, the techniques disclosed herein are applicable to any technically feasible address representation. For example, in some embodiments the compiler 150 may be configured to operate on complex resource address types with very convoluted representations.

While processing the instructions 305, the dependency analyzer 222 uses the partition structure 350 to indirectly identify overlaps between the address signatures included in the opio objects 310 included in the "current" instruction 305 and the address signatures 312 included in the opio objects 310 included in previous instructions 305. To identify these overlaps, the dependency analyzer 222 includes both a signature function 330 and a lookup function 320. More specifically, the input to the signature function 330 is a particular address signature 312 and the output of the signature function 330 is a set of "overlapping" partition elements 352. Together, the set of "overlapping" partition elements 352 include all of the related address bits 354 corresponding to the address bits 315 included in the input address signature 312 without including any related address bits 354 corresponding to address bits 315 not included in the input address signature 312. Similarly, the input to the lookup function 320 is a set of "overlapping" partition elements 352 and the output is a set of "overlapping" opio objects 310. Together, the set of "overlapping" opio objects 310 include all of the opio objects 310 corresponding to related opio objects 356 included in all of the "overlapping" partition elements 352 without including any opio objects 310 corresponding to related opio objects 356 not included in the "overlapping" partition elements 352.

After using the lookup function 320 to identify the "overlapping" opio objects 310 for each opio object 310 included in a "current" instruction 305, the dependency analyzer 222 determines dependency links between the opio objects 310 included in the "current" instruction 305 and the opio objects 310 included in any previous instructions 305. Subsequently, the dependency analyzer 222 incrementally modifies both the dependency graph 340 and the partition structure 350 to reflect the determined dependency links. For example, as persons skilled in the art will understand, the dependency analyzer 222 may remove one or more related opio objects 356 from one or more partition elements 352 to reflect partial or complete shielding of the corresponding opio objects 310 by the "current" instruction 305.

In some embodiments, the dependency analyzer 222 (and the included signature function 330) refines the partition structure 350 on-the-fly as new instructions 305 are received to both include relevant data and to exclude irrelevant data. For example, the dependency analyzer 222 may be configured to ensure the partition structure 350 reflects the opio objects 310 included in the new instruction 305 as well as all previous, currently visible opio objects 310 (i.e., opio objects 310 whose ordering may affect the validity of any instruction 305 reordering).

And, in some embodiments, the signature function 330 may refine the partition structure 350 incrementally. For example, as part of determining the set of "overlapping" partition elements 352, the signature function 330 may identify a set of "unmatched" address bits 315. Each of the "unmatched" address bits 315 is included in the input address signature 312, but the corresponding related address bit 354 is not included in any existing partition element 352 included in the partition structure 350. To completely represent the input address signature 312 within the partition structure 350, the signature function may create a "new" partition element 352 including exactly the set of related address bits 354 corresponding to the set of "unmatched" address bits 315.

Further, the signature function 330 may incrementally repartition an existing partition element 352. For example, as part of determining the set of "overlapping" partition elements 352, the signature function 330 may identify a "intersecting" partition element 352 that includes one or more related address bits 354 corresponding to the address bits 315 included in the input address signature 312, but also includes one or more related address bits 354 corresponding to address bits 315 that are not included in the input address signature 312. In one embodiment, the signature function 330 incrementally repartitions the "intersecting" partition element 352 by creating a new, "nonoverlapping" partition element 352 and, subsequently, moving all the related address bits 354 that do not correspond to address bits 315 included in the input address signature 312 from the "intersecting" partition element 352 to the new, "nonoverlapping" partition element 352. As part of this process, the signature function 330 maintains the relevant information (obtained from the analysis of previous instructions 305) by copying the related opio objects 356 included in the "intersecting" partition element 352 to the "nonoverlapping" partition element 352.

As persons skilled in the art will understand, any number of the techniques disclosed herein may be used in any instruction scheduling process in any combination and may be implemented in any technically feasible fashion. Furthermore, in some embodiments, the techniques disclosed herein may be used in conjunction with prior-art techniques. For example, in one embodiment, prior-art N-square algorithms are used directly in conjunction with the granular address bits 315 until the number of opio objects 310 reaches a pre-defined limit beyond which the performance of the prior-art algorithm may deteriorate unacceptably. After the pre-defined limit is reached, the prior-art algorithms are abandoned in favor of the overlapping search and partition-based strategies disclosed herein.

Advantageously, the address signature 312 and the partition elements 352 may be configured to include memory elements at any defined level of granularity. For example, in an alternative embodiment, the architecture configuration text file 220 may define a memory resource at the register bank level and a memory element at the register level. In such an embodiment, the address signatures 312 and the partition elements 352 may both be configured to include one or more registers instead of, respectively, the address bits 315 and the related address bits 354.

Figure 4:
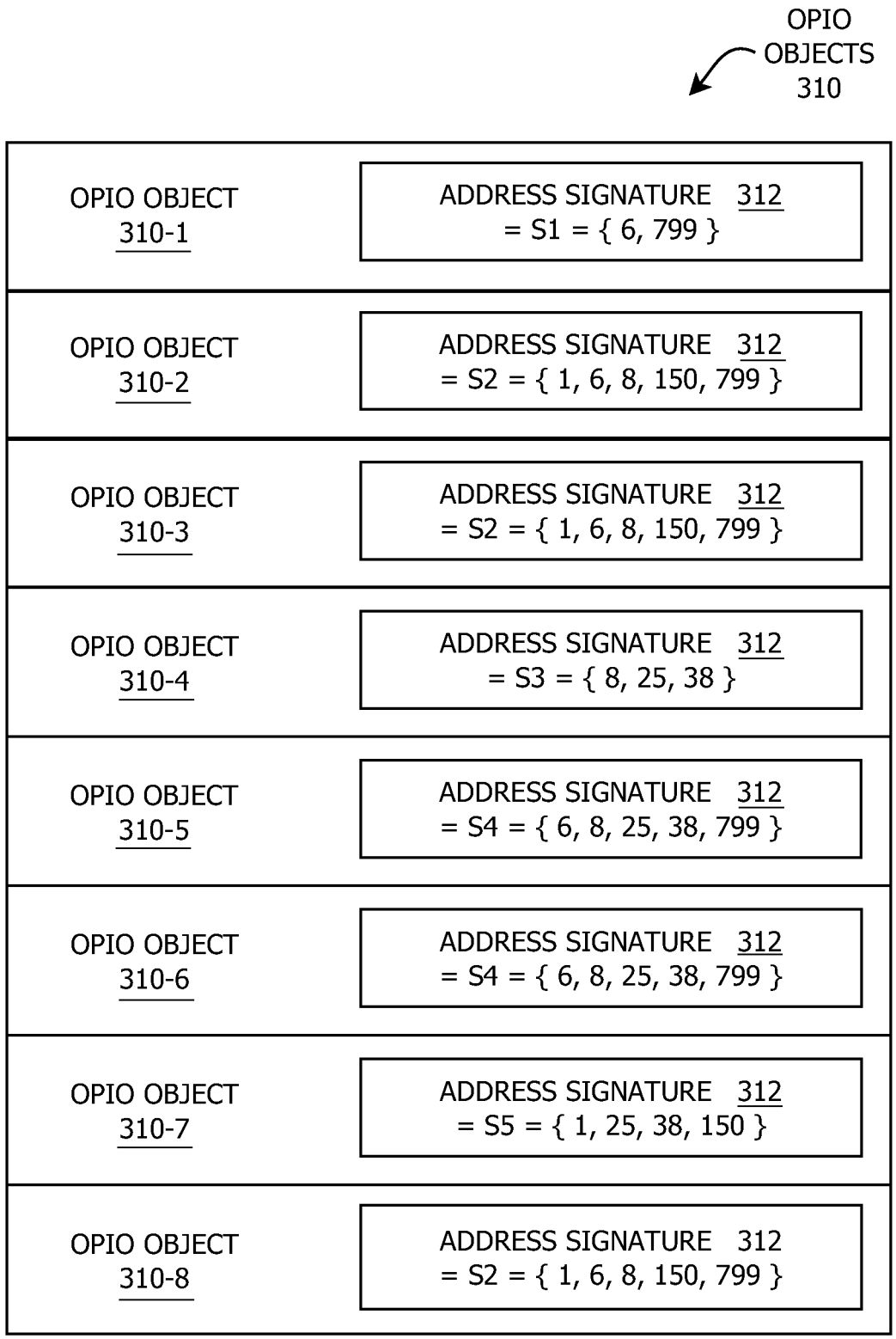
FIG. 4 is a conceptual diagram illustrating exemplary operation input-output (opio) objects of FIG. 3, according to one embodiment of the present invention.

FIG. 4 is a conceptual diagram illustrating exemplary opio objects 310 of FIG. 3, according to one embodiment of the present invention. In the example shown in FIG. 4, there are eight opio objects 310 included in a single instruction 305-1 of FIG. 3 (not shown in FIG. 4). As shown, each of the eight opio objects 310 includes an address signature 312. Again, referring back to FIG. 3, each address signature 312 includes any number of address bits 315. In FIG. 3, the address bits 315 are labeled individually (e.g. 315-1). In contrast, in FIG. 4, the address bits 315 included in the address signature 312 are represented as a named set (e.g., "S1") with the individual address bits 315 enclosed in braces. For example, the address bits 315 included in the address signature 312 included in the exemplary opio object 310-1 in FIG. 4 is represented as "S1={6, 799}." If, instead, the address bits 315 included in the address signature 312 included in the exemplary opio object 310-1 in FIG. 4 were labeled individually, the address bits 315 would be represented as "315-1=6" and "315-2=799." (Herein, sets of like elements may be named and the individual elements of a set of like elements may be enclosed in braces.)

In the example depicted, the dependency analyzer 222 receives the exemplary opio objects 310-1 through 310-8 sequentially, receiving 310-1 first and 310-8 last. As previously disclosed, as part of processing opio objects 310, the dependency analyzer 222 sequentially passes the address signature of each opio object 310 to the signature function 330 of FIG. 3. The signature function 330 then translates the address signature (a specific representation) of each opio object 310 to a corresponding generic address signature supported by partitioning algorithms included in the dependency analyzer 222. As shown, although there are eight exemplary opio objects 310, there are only five distinct exemplary address signatures 312. The opio objects 310-2, 310-3, and 310-8 all include the same address signature 312 (i.e., "S2") and do not include any additional address signatures 312. Similarly, the opio objects 310-5 and 310-6 both include the same address signature 312 (i.e., "S4") and do not include any additional address signatures 312.

Figure 5:
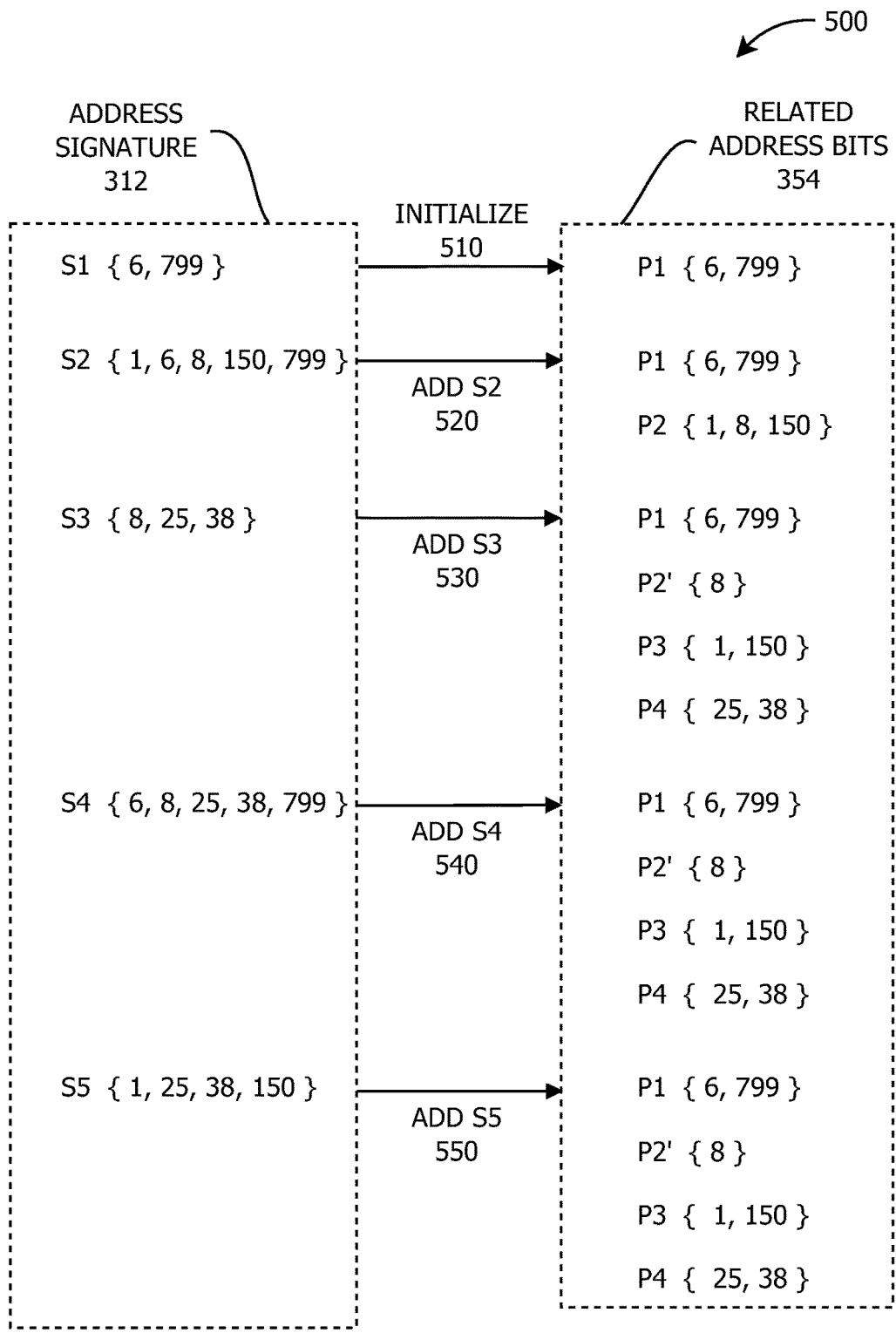
FIG. 5 is a conceptual diagram illustrating the mapping of the exemplary address signatures of FIG. 4 to related address bits, according to one embodiment of the present invention.

FIG. 5 is a conceptual diagram illustrating the mapping of the exemplary address signatures 312 of FIG. 4 to related address bits 354, according to one embodiment of the present invention. As shown in FIG. 5, each set of related address bits 354 is named (e.g., "P1".) And, referring back to FIG. 3, each set of related address bits 354 is included in a corresponding partition element 352 (not shown in FIG. 5). For example, the partition element 352-1 includes the related address bits 354 "P1." Further, the set of partition elements 352 are included in the partition structure 350 (also not shown in FIG. 5).

In the example shown, the signature function 330 of FIG. 3 first receives the address signature 312 "S1 {6, 799}." Since the address signature 312 "S1" is the first address signature 312 received, the signature function 330 creates a partition structure 350. Further, since there are no existing partition elements 352 included in the partition structure 350 and, therefore, no related address bits 354, there are no overlaps between related address bits 354 and the corresponding address bits 315 included in the address signature 312 "S1." Consequently, the signature function 330 "initializes" 510 the partition structure 350 to include a single partition element 352-1 that includes exactly the related address bits 354 "P1{6, 799}" corresponding to the address signature 312 "S1 {6, 799}."

The signature function 330 then receives the address signature 312 "S2 {1, 6, 8, 150, 799}." To "add S2" 520 to the partition structure 350, the signature function 330 first identifies any overlaps with the existing partition elements 352. All of the related address bits 354 included in the partition element 352-1 "P1" correspond to address bits 315 that are included in the address signature 312 "S2." Consequently, the signature function 330 identifies partition element 352-1 "P1" as an "overlapping" partition element 352. Since the three address bits 315 1, 8, and 150 are included in the address signature 312 "S2," but no corresponding related address bits 354 are included in any existing partition element 352, the signature function 330 creates a "new" partition element 352-2 "P2" that includes exactly the related address bits 1, 8, and 150.

The signature function 330 then receives the address signature 312 "S3 {8, 25, 38}." To "add S3" 530 to the partition structure 350, the signature function 330 first identifies any overlaps with the existing partition elements 352. One of the related address bits 354 (i.e., 8) included in the partition element 352-2 "P2" corresponds to an address bit 315 included in the address signature 312 "S3," but two related address bits 354 (i.e., 1 and 150) included in the partition element 352-2 "P2" do not correspond to address bits 315 included in the address signature 312 "S3." Consequently, as described previously herein, the signature function 330 splits the "overlapping" partition element 352-2 "P2." More specifically, the signature function 330 creates a new "nonoverlapping" partition element 352-3 "P3" and, subsequently, moves the related address bits 354 that do not correspond to address bits 315 included in the address signature 312 "S3" from the partition element 352-2 "P2" to the partition element 352-3 "P3." As shown, the modified partition element 352-2 "P2" is now designated "P2' {8}'" and the "nonoverlapping" partition element 352-3 is labeled "P3 {1, 150}". Subsequently, since two of the address bits 315 (i.e., 25 and 38) included in the address signature 312 "S2" are not included in an existing partition element 352, the signature function 330 creates a "new" partition element 352-4 "P4" that includes exactly the two related address bits 354 25 and 38.

The signature function 330 then receives the address signature 312 "S4 {6, 8, 25, 38, 799}." To "add S4" 540 to the partition structure 350, the signature function 330 first identifies any overlaps with the existing partition elements 352. The signature function 330 identifies three "overlapping" partition elements 352 "P1," "P2'," and "P4." Since each of the identified "overlapping" partition elements 352 includes only related address bits 354 corresponding to address bits 315 included in the address signature 312 "S4" and, together, the "overlapping" partition elements 352 include the related address bits 354 corresponding to all of the address bits 315 included in the address signature 312 "S4," the signature function 330 does not create any new partition elements 352, nor does the signature function 330 repartition any existing partition elements 352.

Finally, the signature function 330 receives the address signature 312 "S5 {1, 25, 38, 150}." To "add S5" 550 to the partition structure 350, the signature function 330 first identifies any overlaps with the existing partition elements 352. The signature function 330 identifies two "overlapping" partition elements 352 "P3" and "P4." Since each of the identified "overlapping" partition elements 352 includes only related address bits 354 corresponding to address bits 315 included in the address signature 312 "S5" and, together, the "overlapping" partition elements 352 include the related address bits 354 corresponding to all of the address bits 315 included in the address signature 312 "S5," the signature function 330 does not create any new partition elements 352, nor does the signature function 330 repartition any existing partition elements 352.

Advantageously, as detailed above, the signature function 330 minimizes the number of partitions elements 352, thereby increasing the efficiency of the dependency analysis. For example, for a particular address signature 312, if each of the identified "overlapping" partition elements 352 includes only related address bits 354 corresponding to address bits 315 included in the address signature 312 and, together, the "overlapping" partition elements 352 include the related address bits 354 corresponding to all of the address bits 315 included in the address signature 312, then the signature function 330 does not add any partition elements 352 to the partition structure 350. Further, as persons skilled in the art will understand, the set of different input address signatures 312 included in a typical sequence of instructions 305 stabilizes quickly. Consequently, the number of partition elements 352 included in the partition structure 350 also stabilizes quickly. This further increases the likelihood that the dependency analyzer 222 may execute the dependency analysis at the granular level of the address bits 315 while retaining an acceptable performance speed.

Figure 6:
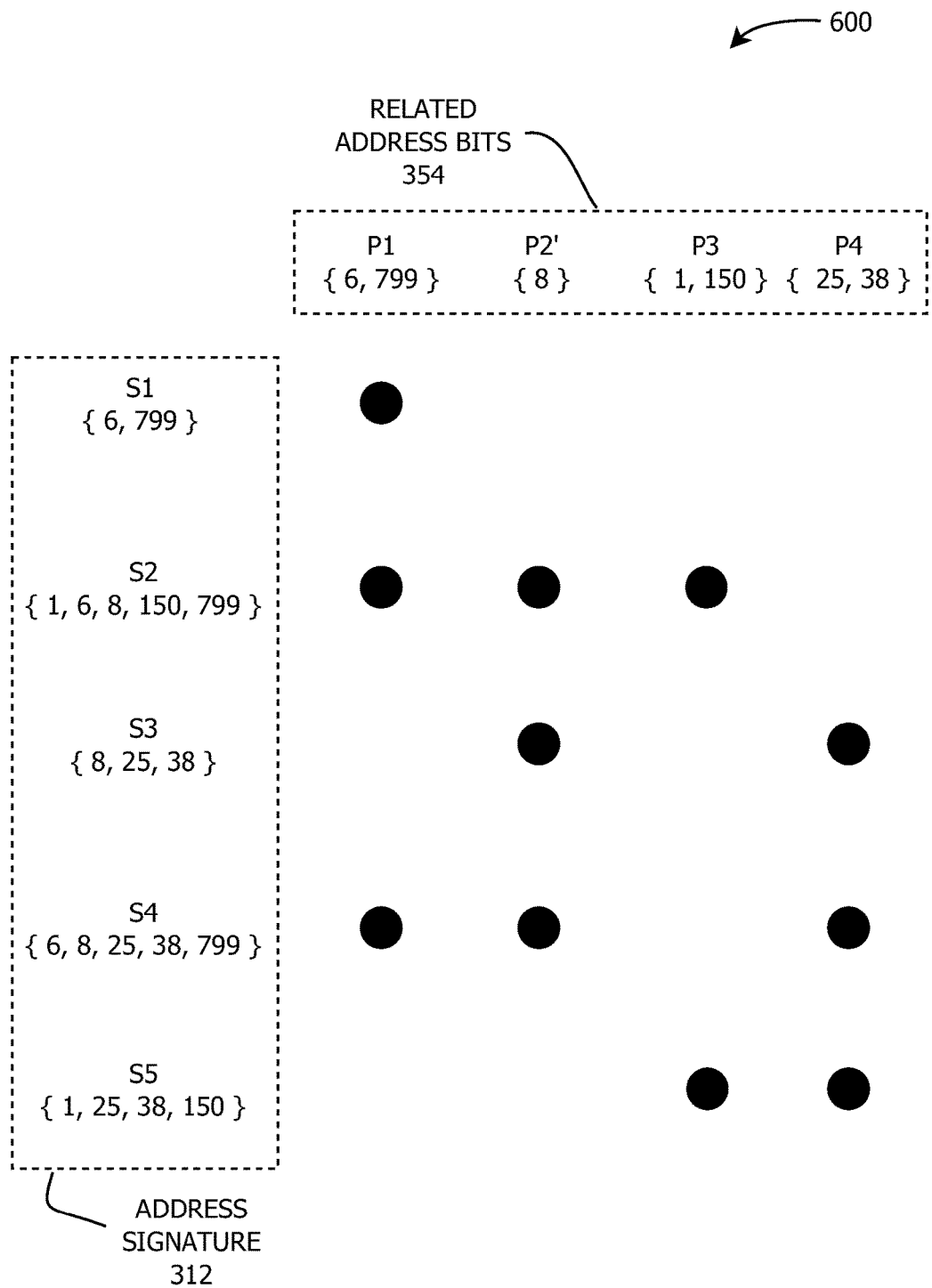
FIG. 6 is a conceptual diagram illustrating the completed mapping of the exemplary address signatures of FIG. 4 to the related address bits of FIG. 5, according to one embodiment of the present invention.

FIG. 6 is a conceptual diagram illustrating the completed mapping of the exemplary address signatures 312 of FIG. 4 to the related address bits 354 of FIG. 5, according to one embodiment of the present invention. More specifically, FIG. 6 depicts the overlaps between the exemplary address signatures 312 and the related address bits 354 included in the partition elements 352. In FIG. 6, each of the address signatures 312 is depicted as a row and each of the related address bits 354 is depicted as a column. An overlap between a particular address signature 312 and a particular set of related address bits 354 is depicted by a solid circle at the intersection of the row corresponding to the particular address signature 312 and the column corresponding to the particular set of related address bits 354.

As shown, the partition element 352 "P1" includes all of the related address bits 354 corresponding to all of the address bits 315 included in the address signature 312 "S1" without including any related address bits 354 corresponding to address bits 315 not included in the address signature 312 "S1."

Similarly, the partition elements 352 "P1," "P2'", and "P3" include all of the related address bits 354 corresponding to all of the address bits 315 included in the address signature 312 "S2" without including any related address bits 354 corresponding to address bits 315 not included in the address signature 312 "S2."

The partition elements 352 "P1," "P2'" and "P4" include all of the related address bits 354 corresponding to all of the address bits 315 included in the address signature 312 "S3" without including any related address bits 354 corresponding to address bits 315 not included in the address signature 312 "S2."

The partition elements 352 "P1," "P2'," and "P4" include all of the related address bits 354 corresponding to all of the address bits 315 included in the address signature 312 "S4" without including any related address bits 354 corresponding to address bits 315 not included in the address signature 312 "S4."

And the partition elements 352 "P3" and "P4" include all of the related address bits 354 corresponding to all of the address bits 315 included in the address signature 312 "S5" without including any related address bits 354 corresponding to address bits 315 not included in the address signature 312 "S5."

Figure 7:
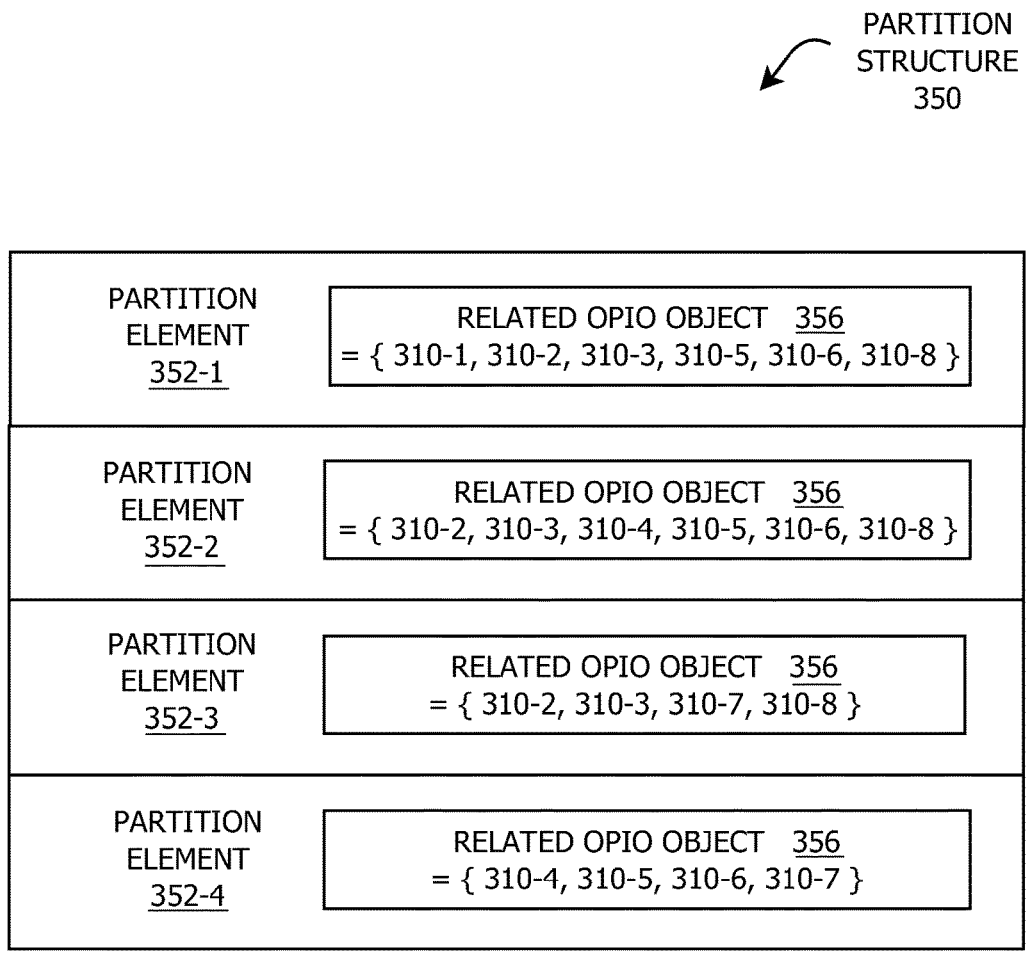
FIG. 7 is a conceptual diagram illustrating the partition structure of FIG. 3 corresponding to the exemplary opio objects of FIG. 4, according to one embodiment of the present invention.

FIG. 7 is a conceptual diagram illustrating the partition structure 350 of FIG. 3 corresponding to the exemplary opio objects 310 of FIG. 4, according to one embodiment of the present invention. More specifically, FIG. 7 shows the partition structure 350 after the signature function 330 has mapped the exemplary address signatures 312 of FIG. 4 included in the exemplary opio objects 310 also of FIG. 4 to the related address bits 354 of FIG. 5 and the dependency analyzer 222 has updated the partition structure 350 to reflect the exemplary opio objects 310 of FIG. 4 (i.e., opio objects 310-1 through 310-8.)

Referring back to FIG. 6, partition element 352-1 corresponds to "P1" and includes the related address bits 354 {6, 799}. And, as shown, partition element 352-1 also includes the related opio objects 356 corresponding to the exemplary opio objects 310-1, 310-2, 310-3, 310-5, 310-6, and 310-8 of FIG. 4. As previously disclosed, each opio object 310 corresponding to one of the related opio objects 356 included in a particular partition element 352 includes each of the address bits 315 corresponding to the related address bits 354 included in the particular partition element 352. Consequently, as shown in FIG. 4, each of the exemplary opio objects 310-1, 310-2, 310-3, 310-5, 310-6, and 310-8 include the two address bits 315 6 and 799. Further, neither the exemplary opio objects 310-4 nor 310-7 (i.e. the exemplary opio objects 310 that do not correspond to related opio objects 356 included in the partition element 352-1) include the two address bits 315 6 and 799.

Similarly, partition element 352-2 corresponds to "P2'," includes the related address bits 354 "{8}," and includes the related opio objects 356 corresponding to the exemplary opio objects 310-2, 310-3, 310-4, 310-5, 310-6, and 310-8. Partition element 352-3 corresponds to "P3," includes the related address bits 354 "{1, 150}," and includes the related opio objects 356 corresponding to the exemplary opio objects 310-2, 310-3, 310-7, and 310-8. And partition element 352-4 corresponds to "P4," includes the related address bits 354 "{25, 38}," and includes the related opio objects 356 corresponding to the exemplary opio objects 310-4, 310-5, 310-6, and 310-7.

Figure 8:
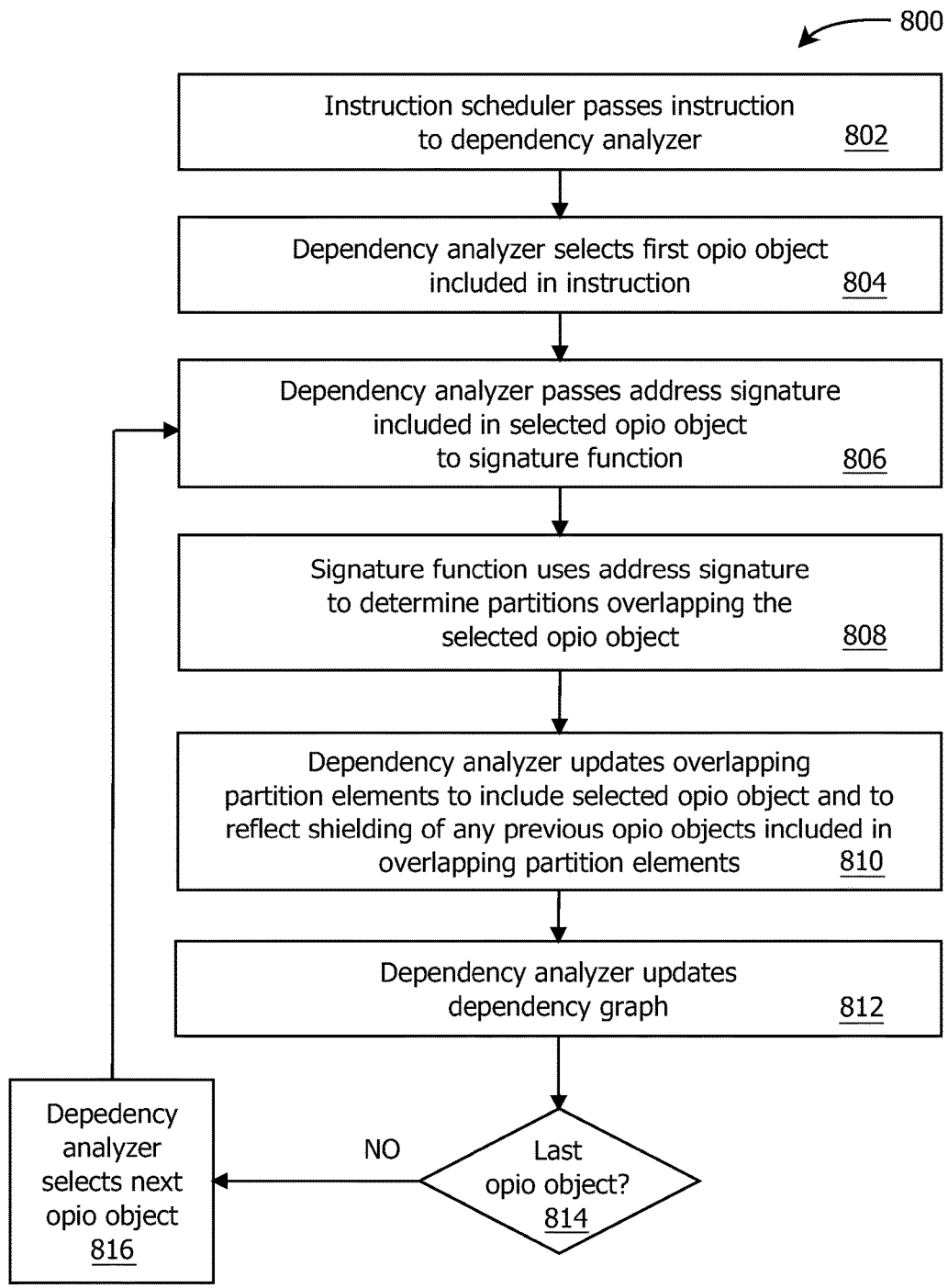
FIG. 8 is a flow diagram of method steps for determining memory resource dependencies between the instructions, according to one embodiment of the present invention.

FIG. 8 is a flow diagram of method steps for determining memory resource dependencies between instructions, according to one embodiment of the present invention. Although the method steps are described with reference to the systems of FIGS. 1-3, persons skilled in the art will understand that any system configured to implement the method steps, in any order, falls within the scope of the present invention.

As shown, a method 800 begins at step 802, where the instruction scheduler 220 passes a current instruction 305 to the dependency analyzer 222. At step 804, the dependency analyzer 222 selects a first opio object 310 included in the instruction 305. At step 806, the dependency analyzer 222 passes the address signature 312 included in the selected opio object 310 to the signature function 330 (included in the dependency analyzer 222). At step 808, the signature function 330 uses the address signature 312 to determine the partition elements 352 (included in the partition structure 350) overlapping the selected opio object 310. At step 810, the dependency analyzer 222 updates the partition elements 352 identified by the signature function 330 as overlapping the selected opio object 310 to include the selected opio object 310 and to reflect shielding of any previous opio objects 310. More specifically, the previous opio objects 310 are the opio objects 310 that are included in the partition elements 352 identified as overlapping the selected opio object 310. As described in detail in FIG. 3, as part of this update process, the dependency analyzer may use the lookup function 320 (included in the dependency analyzer 222) to identify overlapping opio objects 310 and, subsequently, determine dependency links between the opio objects 310 and overlapping opio objects 310.

At step 812, the dependency analyzer 222 updates the dependency graph 340 to reflect the determined dependency links between the instruction 305 and any previous instructions 305. At step 814, if the dependency analyzer determines that the selected opio object 310 is not the last opio object 310 included in the instruction 305, then the method 800 proceeds to step 816. At step 816, the dependency analyzer selects a next opio object 310 included in the instruction 305, and the method 800 returns to step 806.

The method 800 continues to execute steps 806 through 816, identifying and updating the partition elements 352 overlapping the selected opio object 310 and updating the dependency graph 340, until the signature function 330 has determined the sets of partition elements 352 overlapping all of the opio objects 310 included in the instruction 305. If, at step 810, the dependency analyzer 222 determines that the selected opio object 310 is the last opio object 310 included in the instruction 305, then the method 800 terminates. In alternative embodiments, the dependency analyzer 222 may not include the signature function 330 and may perform the steps 806 through 816 in any technically feasible manner.

Figure 9A:
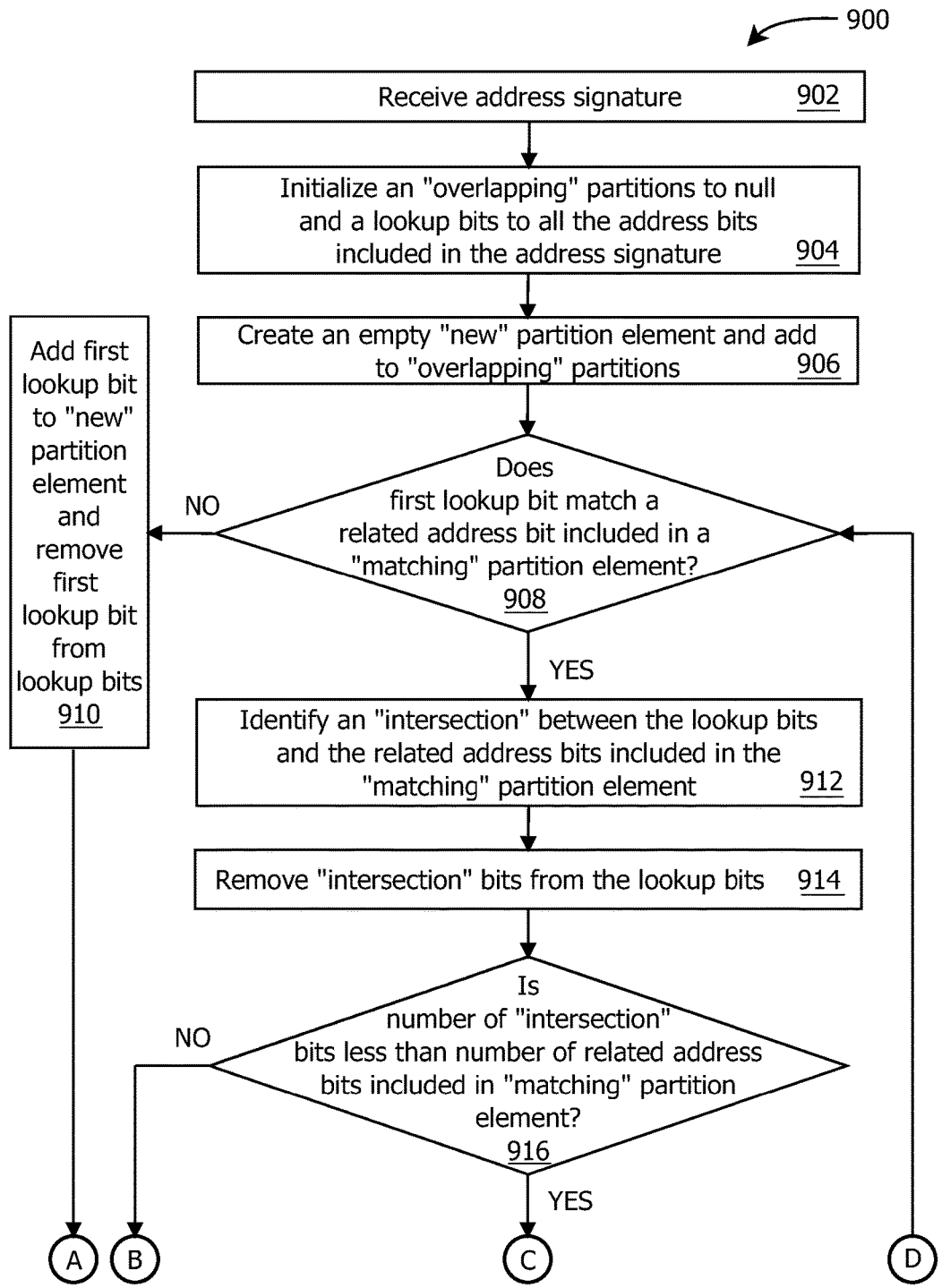
FIGS. 9A-9B set forth a flow diagram of method steps for mapping dependencies between objects and subsets of memory resources, according to one embodiment of the present invention.
Figure 9B:
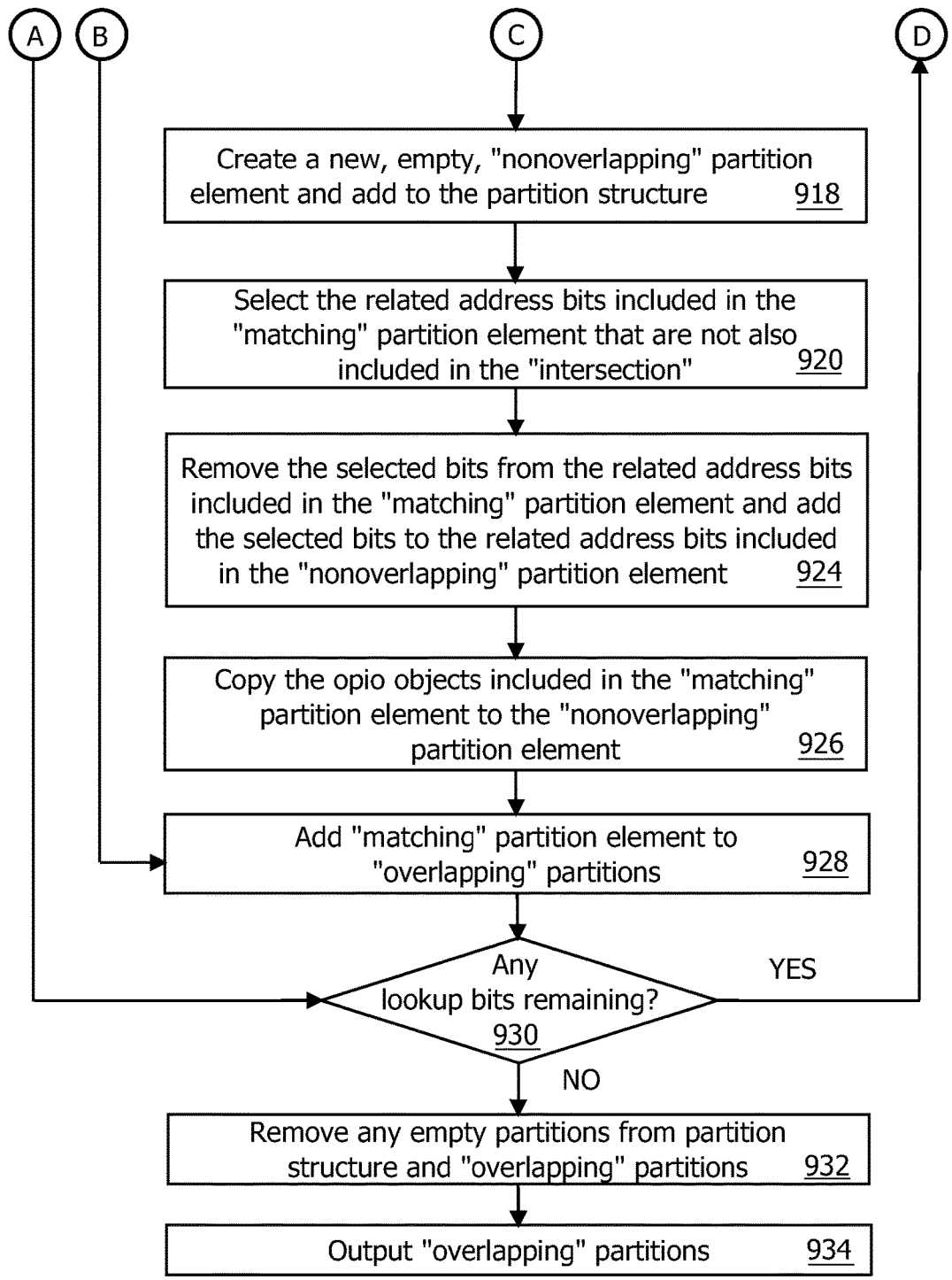

FIGS. 9A-9B set forth a flow diagram of method steps for mapping dependencies between objects and subsets of memory resources, according to one embodiment of the present invention. Although the method steps are described with reference to the systems of FIGS. 1-3, persons skilled in the art will understand that any system configured to implement the method steps, in any order, falls within the scope of the present invention.

As shown, a method 900 begins at step 902, where the signature function 330 receives an address signature 312 from the dependency analyzer 222. At step 904, the signature function 330 initializes a set of "overlapping" partition elements 352 to null (i.e., no partition elements 352 are included in the set). And the signature function 330 initializes a set of lookup bits to reflect all of the address bits 315 included in the address signature 312. At step 906, the signature function 330 creates an empty "new" partition element 352 and adds the "new" partition element 352 to both the set of "overlapping" partition elements 352 and the partition structure 350. At step 908, the signature function 330 determines whether the first lookup bit corresponds to a related address bit 354 in a "matching" partition element 352 included in the partition structure 350. As previously disclosed, only one partition element 352 included in the partition structure 350 may include a particular related address bit 354.

If, at step 908, the signature function 330 determines that the related address bit 354 corresponding to the first lookup bit is not included in any of the partition elements 352, then the method 900 proceeds to step 910. At step 910, the signature function 330 adds the first lookup bit to the related address bits 354 included in the "new" partition element 352 and removes the first lookup bit from the set of lookup bits. Subsequently, the method 900 proceeds to step 930.

If, at step 908, the signature function determines that the related address bit 354 corresponding to the first lookup bit is included in a "matching" partition element 352, then the method 900 proceeds to step 912. At step 912, the signature function 330 identifies an "intersection" between the set of lookup bits and the related address bits 354 included in the "matching" partition element 352. The signature function 330 may determine the intersection between the two sets in any technically feasible fashion. At step 914, the signature function 330 removes the "intersection" bits (i.e., the bits included in the "intersection"), from the set of lookup bits. At step 916, the signature function 330 determines whether the number of "intersection" bits is less than the number of related address bits 354 included in the "matching" partition element 352. Advantageously, by comparing the number of intersection bits to the number of related address bits 354, the signature function 330 may avoid a more time-consuming bit-by-by comparison between the intersection bits and the related address bits 354. If, at step 916, the signature function 330 determines that the number of "intersection" bits is not less than the number of related address bits 354 included in the "matching" partition element 352, then the method 900 proceeds to step 928. At step 928, the signature function 330 adds the "matching" partition element 352 to the set of "overlapping" partition elements 352.

If, at step 916, the signature function 330 determines that that the number of "intersection" bits is less than the number of related address bits 354 included in the matching partition element 352, then the method 900 proceeds to step 918. At step 918, the signature function 330 creates a new, empty "nonoverlapping" partition element 352 and, subsequently, adds the "nonoverlapping" partition element 352 to the partition structure 350. At step 920, the signature function 330 selects the related address bits 354 included in the "matching" partition element 352 that are not also included in the "intersection." In other words, the signature function 330 selects the related address bits 354 included in the "matching" partition element 352 that do not correspond to any of the address bits 315 included in the address signature 312. At step 924, the signature function 330 distributes the related address bits 354 included in the "matching" partition element 352 between the "matching" partition element 352 and the "nonoverlapping" partition element 352. More specifically, the signature function 330 removes the selected bits from the related address bits 354 included in the "matching" partition element 352 and adds the selected bits to the related address bits 354 included in the "nonoverlapping" partition element 352. At step 926, the signature function 330 copies the related opio objects 356 included in the "matching" partition element 352 to the related opio objects 356 included in the "nonoverlapping" partition element 352, thereby preserving the complete mapping of the previous opio objects 310. At step 928, the signature function 330 adds the "matching" partition element 352 to the set of "overlapping" partition elements 352.

At step 930, if the signature function 330 determines that there are one or more lookup bits remaining, then the method 900 returns to 908. The method 900 continues to execute steps 908 through 930, mapping lookup bits to the partition structure 350, until the signature function 330 has mapped all of the lookup bits. If, at step 930, the signature function 330 determines that there are no lookup bits remaining, then the method 900 proceeds to step 932.

At step 932, the signature function 330 removes any empty partition elements 352 from both the partition structure 350 and the set of "overlapping" partition elements 352. For example, if all of the address bits 315 included in the address signature 312 were also included as corresponding related address bits 354 included in partition elements 352 before the signature function 330 processed the address signature 312, then the "new" partition element 352 would be empty and the signature function 330 would remove the "new" partition element 352 from both the partition structure 350 and the set of "overlapping" partition elements 352.

At step 934, the signature function 330 outputs the set of "overlapping" partition elements 352. Together, the set of "overlapping" partition elements 352 include all of the related address bits 354 corresponding to the address bits 315 included in the input address signature 312 without including any related address bits 354 corresponding to address bits 315 not included in the input address signature 312.

In sum, the disclosed approach to instruction dependency analysis implements overlapping search techniques in conjunction with incremental set partition based lookup strategies. More specifically, a compiler processes a sequence of instructions using an instruction scheduler which, as part of instruction scheduling, determines the dependencies between the instructions using a dependency analyzer included in the instruction scheduler. For each instruction, the dependency analyzer uses lookup strategies to identify overlaps between the memory resources included in the current instruction and previous instructions. As part of the lookup process, the dependency analyzer first identifies the memory resource overlaps individually for each operation input-output (opio) object included in the instruction. For each of these opio objects, to identify overlaps, the dependency analyzer passes the address signature included in the opio object to a signature function (included in the dependency analyzer). The signature function then employs an overlapping search strategy to map the address signature to a set of partition elements included in a partition structure.

More specifically, the signature function determines a mutually disjunct set of "overlapping" partition elements that, together, include all of the bits included in the address signature without including any bits not included in the address signature. As part of this process, if the signature function identifies a partition element that includes some, but not all, of the bits included in the address signature, then the signature function incrementally repartitions the identified partition element. In one embodiment, the signature function incrementally repartitions the identified partition element by creating a new, nonoverlapping partition element and, subsequently, moving all the bits that do not occur in the signature function from the identified partition element to the new, nonoverlapping partition element. After these modifications, the identified partition element includes only bits that are also included in the address signature, and the new, nonoverlapping partition element includes only bits that are not included in the address signature.

After using the signature function to identify the partition elements that overlap the address signature included in each of the opio objects included in the current instruction, the dependency analyzer looks up (i.e., accesses) each overlapping partition element to determine the corresponding overlapping opio objects. And, after determining the overlapping opio objects for each opio object included in the instruction, the dependency analyzer updates a dependency graph which the instruction scheduler eventually uses to guide instruction reordering. Throughout this lookup process, the dependency analyzer (and the included signature function) updates the partition structure to include relevant data. For example, the dependency analyzer ensures each partition element reflects the opio objects included in the current instruction as well as all previous, currently visible opio objects (i.e., opio objects whose ordering may affect the validity of any instruction reordering). In other words, the dependency analyzer refines the existing partition structure on-the-fly as new opio objects are added.

Advantageously, each partition element included in the partition structure represents a set of address bits that are functionally equivalent for dependency analysis. For example, if two bits "p1" and "p2" are included in a particular partition element "P5," then each opio object would access either both "p1" and "p2" or would access neither "p1" nor "p2." Therefore, during dependency analysis, "p1" and "p2" may be treated as a single element. By reducing the problem size in this fashion, the likelihood of unacceptably degrading compiler execution speed may be decreased compared to prior-art approaches configured to use memory resources of similar granularity. Furthermore, since the granularity of the memory resources and, therefore, the dependency analysis, used in the disclosed approach is finer than the granularity used in many prior-art approaches, the instruction scheduler may consider valid instruction reorderings that these more conservative prior-art approaches would incorrectly consider invalid.

Consequently, the disclosed techniques may enable the compiler to retain an acceptable compilation speed while reordering instructions included in a software application such that the speed at which the targeted processor executes the software application exceeds execution speeds achieved using prior-art techniques. In addition, as persons skilled in the art will understand, the disclosed techniques may be applied at any level of memory resource granularity. For example, the instruction scheduler may be configured to use partitions that include register-level memory resources instead of bit-level memory resources.

While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of the present invention is determined by the claims that follow.

What is claimed is:

1. A method for determining instruction dependencies in a software application, the method comprising:
   receiving a first instruction and a second instruction included in the software application;
   identifying a first object that is included in the first instruction and indicates a first set of memory elements affected by the first instruction;
   identifying a second object that is included in the second instruction and indicates a second set of memory elements affected by the second instruction;
   mapping the first object, the first set of memory elements, the second object, and the second set of memory elements to a partition structure that includes a set of disjunct partition elements representing memory element overlaps between objects, wherein a first disjunct partition element included in the partition structure includes the first object, the second object, and a first set of address bits specified by both the first object and the second object, and a second disjunct partition element included in the partition structure includes the second object and a second set of address bits specified by the second object and not the first object;
   identifying a match between the first object and the first disjunct partition element;
   performing a look-up operation on the first disjunct partition element to determine an object dependency between the first object and the second object; and
   determining an instruction dependency between the first instruction and the second instruction based on the object dependency.

2. The method of claim 1, wherein, for the first set of address bits included in both the first set of memory elements and the second set of memory elements, mapping the first set of address bits comprises:
   creating the first disjunct partition element;
   associating the first set of address bits with the first disjunct partition element;
   associating the first object with the first disjunct partition element; and
   associating the second object with the first disjunct partition element.

3. The method of claim 1, further comprising:
   identifying a third object that is included in the second instruction and is associated with a third set of memory elements;
   mapping the third object and the third set of memory elements to the partition structure;
   identifying a matching disjunct partition element associated with the first object;
   performing a look-up operation on the matching disjunct partition element to determine a second object dependency between the first object and the third object; and
   determining a second instruction dependency between the first instruction and the second instruction based on the second object dependency.

4. The method of claim 1, wherein each memory element included in the first set of memory elements holds state, and the first object comprises an operation input-output object that may access any number of the memory elements included in the first set of memory elements.

5. The method of claim 4, wherein each memory element comprises one bit or one register.

6. The method of claim 1, wherein the first set of memory elements comprises a set of non-contiguous bits or a set of non-contiguous registers.

7. A method for determining instruction dependencies in a software application, the method comprising:
   receiving a first instruction and a second instruction included in the software application;
   identifying a first object that is included in the first instruction and is associated with a first set of memory elements;

identifying a second object that is included in the second instruction and is associated with a second set of memory elements;

mapping the first object, the first set of memory elements, the second object, and the second set of memory elements to a partition structure that includes a set of disjunct partition elements representing memory element overlaps between objects;

identifying a matching partition element associated with the first object;

performing a look-up operation on the matching partition element to determine an object dependency between the first object and the second object; and determining an instruction dependency between the first instruction and the second instruction based on the object dependency, wherein, for a first memory element included in both the first set of memory elements and the second set of memory elements, mapping the first memory element comprises:

creating a first partition element;

associating the first memory element with the first partition element;

associating the first object with the first partition element: and associating the second object with the first partition element, and wherein the total number of objects included in the first instruction and the second instruction does not exceed a maximum number of objects associated with a degenerate partition structure.

8. The method of claim 7, wherein, for a second memory element included in both the first set of memory elements and the second set of memory elements, mapping the second memory element comprises:

creating a second partition element;

associating the second memory element with the second partition element;

associating the first object with the second partition element; and associating the second object with the second partition element.

9. A non-transitory computer-readable storage medium including instructions that, when executed by a processing unit, cause the processing unit to determine instruction dependencies in a software application by performing the steps of:

receiving a first instruction and a second instruction included in the software application;

identifying a first operation input-output object that is included in the first instruction and indicates a first set of memory elements affected by the first instruction;

identifying a second operation input-output object that is included in the second instruction and indicates a second set of memory elements affected by the second instruction;

mapping the first operation input-output object, the first set of memory elements, the second operation input-output object, and the second set of memory elements to a partition structure that includes a set of disjunct partition elements representing memory element overlaps between operation input-output objects, wherein each disjunct partition element included in the set of disjunct partition elements includes a different set of one or more related address bits and one or more operation input-output objects that correspond to the set of one or more related address bits, and the second instruction corresponds to at least two different disjunct partition elements;

identifying a matching partition element associated with the first operation input-output object;

performing a look-up operation on the matching partition element to determine an object dependency between the first operation input-output object and the second operation input-output object; and determining an instruction dependency between the first instruction and the second instruction based on the object dependency.

10. The computer-readable storage medium of claim 9, wherein, for a first memory element included in both the first set of memory elements and the second set of memory elements, mapping the first memory element comprises:

creating a first disjunct partition element;

associating the first memory element with the first disjunct partition element;

associating the first operation input-output object with the first disjunct partition element; and associating the second operation input-output object with the first disjunct partition element.

11. The computer-readable storage medium of claim 10, wherein, for a second memory element included in both the first set of memory elements and the second set of memory elements, mapping the second memory element comprises associating the second memory element with the first disjunct partition element.

12. The computer-readable storage medium of claim 9, further comprising:

identifying a third operation input-output object that is included in the second instruction and is associated with a third set of memory elements;

mapping the third operation input-output object and the third set of memory elements to the partition structure;

identifying a second matching disjunct partition element associated with the first operation input-output object;

performing a look-up operation on the second matching disjunct partition element to determine a second object dependency between the first operation input-output object and the third operation input-output object; and determining a second instruction dependency between the first instruction and the second instruction based on the second object dependency.

13. The computer-readable storage medium of claim 9, wherein each memory element included in the first set of memory elements holds state, and the first operation input-output object may access any number of the memory elements included in the first set of memory elements.

14. The computer-readable storage medium of claim 13, wherein each memory element comprises one bit or one register.

15. The computer-readable storage medium of claim 9, wherein the first set of memory elements comprises a set of non-contiguous bits or a set of non-contiguous registers.

16. The computer-readable storage medium of claim 9, wherein the partition structure is separate from a data structure in which the first and second instructions are stored.

17. A non-transitory computer-readable storage medium including instructions that, when executed by a processing unit, cause the processing unit to determine instruction dependencies in a software application by performing the steps of:

receiving a first instruction and a second instruction included in the software application;

identifying a first object that is included in the first instruction and is associated with a first set of memory elements;

identifying a second object that is included in the second instruction and is associated with a second set of memory elements;

mapping the first object, the first set of memory elements, the second object, and the second set of memory elements to a partition structure that includes a set of disjunct partition elements representing memory element overlaps between objects;

identifying a matching partition element associated with the first object;

performing a look-up operation on the matching partition element to determine an object dependency between the first object and the second object; and determining an instruction dependency between the first instruction and the second instruction based on the object dependency, wherein further, for a first memory element included in both the first set of memory elements and the second set of memory elements, mapping the first memory element comprises:

creating a first partition element;

associating the first memory element with the first partition element;

associating the first object with the first partition element; and associating the second object with the first partition element, and wherein the total number of objects included in the first instruction and the second instruction does not exceed a maximum number of objects associated with a degenerate partition structure.

18. The computer-readable storage medium of claim 17, wherein, for a second memory element included in both the first set of memory elements and the second set of memory elements, mapping the second memory element comprises:

creating a second partition element;

associating the second memory element with the second partition element;

associating the first object with the second partition element; and associating the second object with the second partition element.

19. A system configured to determine instruction dependencies, the system comprising:

a processing unit;

a memory that includes instructions that, when executed by the processing unit, cause the processing unit to:

receive a first instruction and a second instruction;

identify a first object that is included in the first instruction and indicates a first set of memory elements affected by the first instruction;

identify a second object that is included in the second instruction and indicates a second set of memory;

map the first object, the first set of memory elements, the second object, and the second set of memory elements to a partition structure that includes a set of disjunct partition elements representing memory element overlaps between objects, wherein each disjunct partition element included in the set of disjunct partition elements includes a different set of one or more related address bits;

identify a matching partition element associated with the first object;

perform a look-up operation on the matching partition element to determine an object dependency between the first object and the second object; and determine an instruction dependency between the first instruction and the second instruction based on the object dependency.

20. The system of claim 19, wherein the memory includes a compiler program configured to pass a first instruction and a second instruction included in a software application to a scheduling program.

* * * * *